March 29, 1960
J. CONLEY ET AL
2,930,407
INSULATED PIPING
Filed June 10, 1957
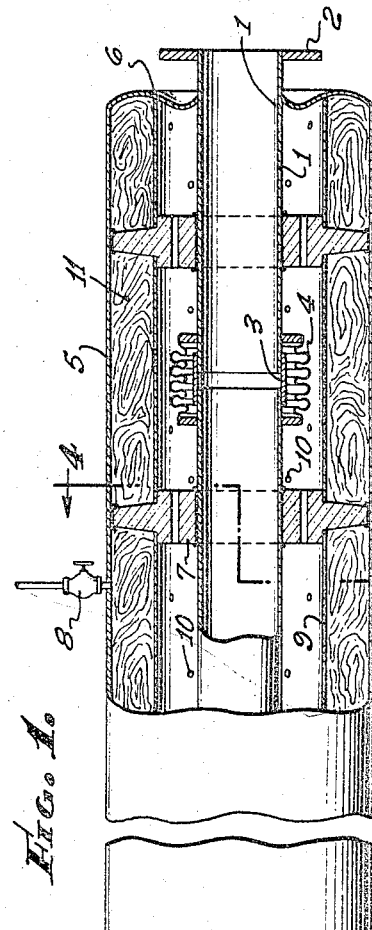
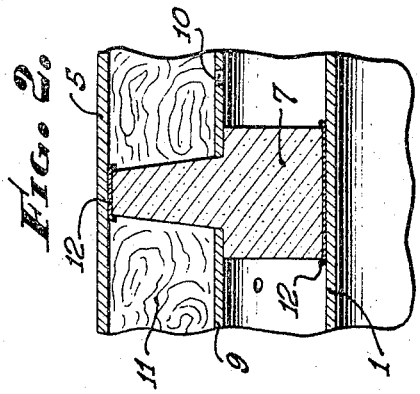
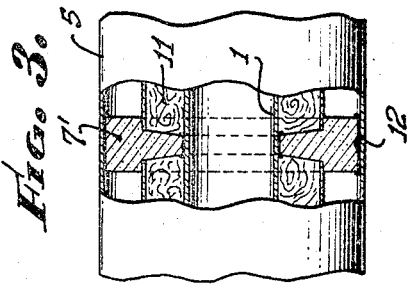
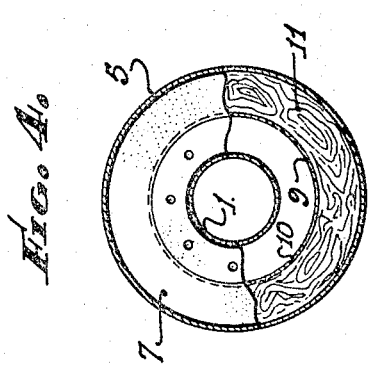
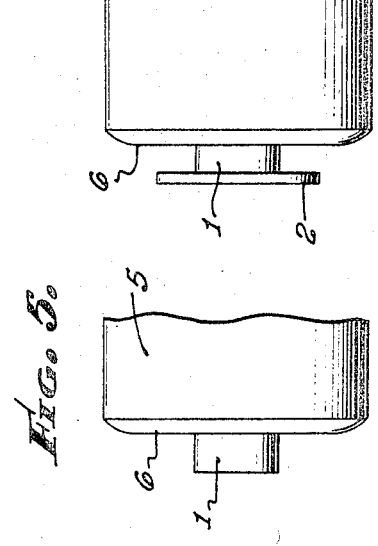
JOHN CONLEY,
GLEN W. MILLER,
INVENTORS.
BY
AGENT.

a plain end, as shown in Figure 5, where it is desired

United States Patent Office 2,930,407
Patented Mar. 29, 1960

2,930,407

INSULATED PIPING

John Conley and Glen W. Miller, Long Beach, Calif.

Application June 10, 1957, Serial No. 664,622

6 Claims. (Cl. 138—64)

This invention relates to insulated piping for carrying fluids at high or low temperatures, and more particularly to prefabricated units of piping which can readily be made up at a site into a continuous pipeline.

It is known to insulate piping, such as metal piping, with coverings and laggings of various kinds. Particular problems, however, arise when extremes of temperature are to be dealt with. This is particularly the case if a material such as liquid oxygen or liquid nitrogen is to be transported over considerable distances through a pipe, and it is necessary to keep heat transfer to an absolute minimum so as to avoid a change from the liquid to the gaseous state. A comparable problem arises in the pipeline transportation of molten solids, where excessive heat loss in the piping system would lead to freezing of the liquid to the solid state and consequent plugging of lines. Many such molten solids are common in chemical plants, for example, phenols, waxes, chlorinated aromatic hydrocarbons, and the like. Gases at high or low temperatures also may require exceptionally low heat loss (or gain) during conveyance, particularly in view of the relatively low specific heat of gases in general.

One difficulty which has been encountered in rendering the heat loss of a pipeline exceedingly low is that it has been found impracticable to form units of suitable insulation properties and subsequently to join such units together at the place where the pipeline is to be constructed. Another difficulty is that expansion or contraction of the lines from periods of use to non-use and particularly during the transition from new construction to a pipeline "on stream" makes efficient insulation difficult of attainment.

An object of the present invention is to provide an insulated pipe section of exceedingly low heat transfer, but readily constructed as a portable unit, so that it may be formed into an insulated pipeline by the con-joining of a plurality of similar units.

Another object of the invention is to provide a means of insulating piping which is unexpectedly efficient, considering the total thickness of the insulating portions thereof.

Another object of the invention is to provide a piping unit including insulating in which construction difficulties resulting from expansion or contraction of the fluid-carrying pipe are minimized.

Another object of the invention is to provide a construction by means of which the load-carrying property of the inner conduit, in which the fluid is flowing, can be replaced with the load-carrying property of the external shell and in this fashion make possible the use of lighter and more economical construction for the inner conduit.

Other objects of the invention will appear as the description thereof proceeds.

In the drawings, Figure 1 is an over-all view, partly in section, of our novel insulated piping section.

Figure 2 is a detail thereof, partly in section.

Figure 3 illustrates an alternative mode of construction.

Figure 4 is an end view of the device shown in Figure 1, and is partly in section.

Figure 5 shows an alternative end construction of our device.

Generally speaking, and in accordance with an illustrative embodiment of our invention, we provide a relatively thin fluid-carrying conduit 1 which may carry on either end a flange 2 for the purposes of connection with similar units, as shown in Figure 1, or may have a plain end, as shown in Figure 5, where it is desired that similar units be connected by welding. This inner conduit 1 is not of one-piece construction, but is interrupted by a spaced and guided sleeve section 3 which is hermetically sealed by a flexible metal bellows 4, as shown in Figure 1. For convenience, this spaced and guided sleeve section will be referred to hereinafter as a "glide joint." This allows relative longitudinal motion of the two segments of conduit 1, within the limits of the glide joint 3 and bellows sealing means 4. We have found that for piping units of 20 foot length, a maximum relative displacement at the bellows and glide joint of one inch is sufficient for most purposes when handling cold fluids at liquid air temperatures. At other temperature ranges, greater or less relative movement will be required.

The fluid-carrying conduit 1 is concentric with an outer housing pipe 5, which however, is slightly shorter in over-all length than inner conduit 1, as appears for example in Figure 1. A hermetic seal is effected between the inner and outer pipes by end diaphragms 6, which conveniently have a sinusoidal cross section as appears from the section thereof shown in Figure 1. We have found it desirable to form these end diaphragms of relatively thin metal, for example, stainless steel of 0.025 inch in diameter, so that flexibility is high and heat loss low through the diaphragm in a radial direction. The inner conduit 1 is maintained concentric with outer housing pipe 5 by means of a plurality of spacers 7, shown in Figure 1 and in more detail in Figure 2, and in Figure 4 in a side view.

Insulation against heat transfer, which of course is heat loss in the event that hot fluids are being transported in the piping, or heat gain in the event that cold fluids are transported, is provided for by an exceptionally effective combination of elements. In the first place, the entire annular space between the outside of conduit 1 and housing 5 is evacuated to a relatively high degree of vacuum, for which we have found less than 20 millimeters of mercury essential. A valve 8 is provided for the convenient attachment of a vacuum pump. Considerably better results are obtained with even lower pressure, such as one or one-tenth millimeter of mercury. In addition to the insulation provided by the vacuum, which alone would not give the results desired, the annular space described is divided into two concentric portions by a cylindrical septum 9 which is conveniently made of sheet aluminum approximately one-fiftieth inch in diameter. (Other metals, such as stainless steel, or plastics such as cellulose acetate may also be used for cylindrical septum.) This is perforated with a plurality of holes 10 to aid in the establishment of a vacuum in the enclosure. On one side of this septum the space between it and the adacent piping is filled with crumpled metal foil, such as aluminum foil or stainless steel foil, most conveniently of thickness 0.0015 inch. In Figure 1, the preferred disposition of this foil 11 is shown, as between septum 9 and outer housing 5. It may nearly as suitably be placed, however, in the space between septum 9 and inner conduit 1, as is shown in the embodiment of Figure 3. In Figure 3 all other elements of our piping unit remain the same except for the disposition of the foil 11 and the inversion of the spacer 7. The septum 9 should divide the annular space described into two portions each of substantial volume. Specifically, the septum 9 should not be closer to either the conduit 1 or the outer housing 5 than about one-fifth the distance between them. We have found that it is essential to provide both a metal foil radiation shield, highly evacuated as has been described, and also a vacuum insulation portion which is free of foil, again as has been described, in series from the standpoint of the heat flow. The septum 9 is held in place by spacers 7, as appears in Figure 1 and in more detail in Figure 2. Where the construction of Figure 3 is adopted, that portion of the spacer having the larger diameter is placed on the side of the septum 9 which is free of foil, as appears in Figure 3. This disposition is adopted in order to keep the foil in place.

For the spacers 7 we have found the shape which appears in Figures 1, 2, 3 and 4 to be satisfactory. The spacers are most conveniently made of a foamed glass or a foamed plastic. Care must be taken in choosing a material of construction for the spacers 7 of such nature that it has very low heat conductivity and does not leak gas slowly so that the vacuum would be impaired. We have found that the material commercially available as "Foam Glass" is satisfactory in these respects, and has sufficient mechanical strength for the purpose at hand. The spacers 7 may be capped on both ends by light aluminum covers 12 with upturned edges, as appears in the figure. Longitudinal holes perforate each spacer, as appears from Figures 1 and 4.

The end-to-end dimension of our piping unit is substantially completely determined by the length of the housing pipe 5 together with those portions of the inner conduit 1 which project beyond the end bells 6. In actual use, where liquid nitrogen was being transported by the inner conduit 1. The temperature of the outer housing 5 deviated only about 4° F. from ambient temperature. The consequent flexing of the end diaphragm or bell 6 is accordingly very slight. By far the greatest dimensional changes when very hot or very cold fluids are transported occur in the two segments of inner conduit 1, and these are taken up substantially completely by relative motion at the glide-joint 3 and bellows 4. The installation of a piping system employing our units is accordingly very simple, since the end-to-end length of a unit with all parts at room temperature is for all practical purposes exactly the same as the end-to-end length when the unit is actually in service carrying fluids at extreme temperatures. It is merely necessary to bolt the units together end-to-end at the flanges 2 or to weld them together at the ends of the inner conduit 1 where the construction of Figure 6 is adopted. When the piping assembly is put into service, no exterior dimensional changes will be apparent.

Excellent results have been obtained with a unit made in accordance with our invention as described here, in which the inner conduit was 4½ inches O.D. stainless steel tubing of 0.100 inch wall thickness, of over-all length 20 feet, the outer housing pipe was of mild steel 12 inches in diameter, 0.130 inch wall thickness, and 19 feet 4 inches in length, the inner cylindrical septum was 8 inches in diameter, the radiation shielding was crumpled aluminum foil of 0.015 inch thickness, and the absolute pressure in the annular space was slightly less than one millimeter of mercury.

While we do not wish to be limited by any theory of action, we believe that the extraordinarily low heat transfer values which we have obtained of units of the type described may be attributed to the effectiveness of the combination of two concentric insulating shells of general cylindrical shape, one of which is a vacuum alone, and the other of which is a crumpled metal foil radiation sheet which is likewise evacuated.

It will be evident that numerous modifications may be made in our device, all within the broad scope of this description and of the claims which follow, and the claims are to be interpreted accordingly.

Having described the invention, we claim:

1. In a thermally insulated piping unit, in combination, an inner conduit having two segments, a glide-joint connecting said segments, a flexible bellows forming a hermetic seal around said glide-joint, an outer housing pipe substantially concentric with said inner conduit, a pair of flexible diaphragms at the ends of said outer housing pipe and connected to said inner conduit at points in proximity to the ends thereof and forming a hermetic seal between said inner conduit and said outer housing pipe, and radiation shielding means concentric with an exterior to said inner conduit and within said outer housing pipe.

2. The piping unit claimed in claim 1, in which the radiation shielding means consists essentially of crumpled metal foil.

3. In a thermally insulated piping unit, in combination, an inner conduit having two segments, a glide-joint connecting said segments, a flexible bellows forming a hermetic seal around said glide-joint, an outer housing pipe substantially concentric with said inner conduit, a pair of flexible diaphragms at the ends of said outer housing pipe and connected to said inner conduit at points in proximity to the ends thereof and forming a hermetic seal between said inner conduit and said outer housing pipe, and radiation shielding means concentric with and exterior to said inner conduit and within said outer housing pipe, said radiation shielding means filling between about one-fifth and four-fifths of the radial space between said inner conduit and said outer housing pipe.

4. In a thermally insulated piping unit, in combination, an inner conduit having two segments, a glide-joint connecting said segments, a flexible bellows forming a hermetic seal around said glide joint, an outer housing pipe substantially concentric with said inner conduit, a pair of flexible diaphragms at the ends of said outer housing pipe and connected to said inner conduit at points in proximity to the ends thereof and forming a hermetic seal between said inner conduit and said outer housing pipe, and radiation shielding means concentric with and exterior to said inner conduit and within said outer housing pipe, and a gas pressure within the space formed between said inner conduit and said outer housing pipe of not more than 20 millimeters of mercury.

5. In a thermally insulated piping unit, in combination, an inner conduit having two segments, a glide-joint connecting said segments, a flexible bellows forming a hermetic seal around said glide-joint, an outer housing pipe substantially concentric with said inner conduit, a pair of flexible diaphragms at the ends of said outer housing pipe and connected to said inner conduit at points in proximity to the ends thereof and forming a hermetic seal between said inner conduit and said outer housing pipe, radiation shielding means concentric with and exterior to said inner conduit and within said outer housing pipe, said radiation shielding means filling between about one-fifth and four-fifths of the radial space between said inner conduit and said outer housing pipe, and a gas pressure within the space formed between said inner conduit and said outer housing pipe of not more than 20 millimeters of mercury.

6. The piping unit claimed in claim 4, in which the radiation shielding means consists essentially of crumpled metal foil.

References Cited in the file of this patent

UNITED STATES PATENTS

| | | |
|---|---|---|
| 951,342 | Sherwood | Mar. 8, 1910 |
| 1,140,633 | Trucano | May 25, 1915 |
| 1,218,895 | Porter | Mar. 13, 1917 |
| 1,890,418 | Schmidt | Dec. 6, 1932 |
| 2,172,612 | Hassenkamm | Sept. 12, 1939 |
| 2,419,278 | Motenbocker | Apr. 22, 1947 |
| 2,451,146 | Baker et al. | Oct. 12, 1948 |
| 2,468,902 | Villiger | May 3, 1949 |
| 2,613,166 | Gronemeyer | Oct. 7, 1952 |